(12) United States Patent
Muramatsu

(10) Patent No.: US 9,517,750 B2
(45) Date of Patent: Dec. 13, 2016

(54) VEHICLE WIPER DEVICE

(71) Applicant: ASMO CO., LTD., Shizuoka-ken (JP)

(72) Inventor: Masami Muramatsu, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 385 days.

(21) Appl. No.: 13/957,183

(22) Filed: Aug. 1, 2013

(65) Prior Publication Data

US 2014/0033465 A1 Feb. 6, 2014

(30) Foreign Application Priority Data

Aug. 6, 2012 (JP) ................................. 2012-174102
Jun. 12, 2013 (JP) ................................. 2013-123957

(51) Int. Cl.
*B60S 1/16* (2006.01)
*B60S 1/24* (2006.01)
*B60S 1/34* (2006.01)

(52) U.S. Cl.
CPC ................ *B60S 1/166* (2013.01); *B60S 1/245* (2013.01); *B60S 1/3409* (2013.01); *B60S 1/3495* (2013.01)

(58) Field of Classification Search
CPC ........ B60S 1/245; B60S 1/3409; B60S 1/3495
USPC ............... 15/250.3, 250.31, 250.29, 250.17, 15/250.21, 250.23
See application file for complete search history.

(56) References Cited

U.S. PATENT DOCUMENTS

| | | | | |
|---|---|---|---|---|
| 1,571,516 A | * | 2/1926 | Folberth | B60S 1/3404 15/250.23 |
| 2,286,449 A | * | 6/1942 | Wahlberg | B60S 1/3404 15/250.23 |
| 2,376,013 A | * | 5/1945 | Sacchini | B60S 1/3406 15/250.23 |
| 2,412,319 A | * | 12/1946 | Carey | B60S 1/3404 15/250.21 |
| 2,821,735 A | * | 2/1958 | Perkins | B60S 1/3406 15/250.23 |
| 3,076,991 A | * | 2/1963 | MacPherson | B60S 1/3406 15/250.23 |
| 3,688,334 A | * | 9/1972 | Peterson | B60S 1/3409 15/250.21 |

(Continued)

FOREIGN PATENT DOCUMENTS

| | | | | |
|---|---|---|---|---|
| JP | 4-173452 | * | 6/1992 | ............... B60S 1/44 |
| JP | 04-197854 A | | 7/1992 | |

(Continued)

*Primary Examiner* — Monica Carter
*Assistant Examiner* — Andrew A Horton
(74) *Attorney, Agent, or Firm* — Christensen Fonder P.A.

(57) ABSTRACT

A wiper of a vehicle wiper device moves between a first position, which is a stop position, and a second position. A first pivot member is pivoted back and forth about a first axis by a drive force of a drive source. A second pivot member is pivotal about a second axis. A coupling pivot member is coupled to the first pivot member pivotally about a third axis and the second pivot member pivotally about a fourth axis. The wiper is coupled to and pivoted integrally with the coupling pivot member. A third position is located between the first position and the second position. A line extending through the third axis and the fourth axis is parallel to a line extending through the first axis and the second axis when the wiper is in a first movable range between the first position and the third position.

10 Claims, 6 Drawing Sheets

(56) References Cited

U.S. PATENT DOCUMENTS

| | | | | |
|---|---|---|---|---|
| 3,729,766 A | * | 5/1973 | Buchanan, Jr. | B60S 1/3409 15/250.21 |
| 4,245,369 A | * | 1/1981 | Clem | B60S 1/3404 15/250.23 |
| 4,546,518 A | * | 10/1985 | Harbison et al. | B60S 1/42 15/250.23 |
| 4,641,390 A | * | 2/1987 | Michalke | B60S 1/3409 15/250.23 |
| 5,142,729 A | * | 9/1992 | Imamura | B60S 1/185 15/250.13 |
| 5,256,950 A | | 10/1993 | Matsumoto et al. | |
| 5,634,234 A | * | 6/1997 | Allain | B60R 1/0602 15/250.003 |
| 8,020,248 B2 | | 9/2011 | Hasegawa | |
| 2003/0056314 A1 | * | 3/2003 | Heinrich | B60S 1/245 15/250.21 |
| 2006/0113942 A1 | * | 6/2006 | Amagasa | B60S 1/08 318/443 |
| 2006/0265831 A1 | * | 11/2006 | Lindkvist | B60S 1/3409 15/250.23 |
| 2007/0271722 A1 | * | 11/2007 | Powell | B60S 1/26 15/250.23 |
| 2010/0139025 A1 | * | 6/2010 | Natsume | B60S 1/0896 15/250.31 |
| 2010/0170054 A1 | | 7/2010 | Matsumoto et al. | |

FOREIGN PATENT DOCUMENTS

| | | |
|---|---|---|
| JP | 2008-018900 A | 1/2008 |
| JP | 2010-163156 A | 7/2010 |
| WO | WO 2008013490 A1 * | 1/2008 ................ B60S 1/28 |

* cited by examiner

α: Output Shaft 36°
β: Wiper 3°

α: Output Shaft 80°
β: Wiper 10°

α:Output Shaft 120°
β:Wiper 30°

α:Output Shaft 191°
β:Wiper 87°

Fig.6

|  | 1st Movable Range (Stop - Lower Reversing Position) | 2nd Movable Range (Lower Reversing Position - Upper Reversing Position) | Overall Movable Range (Stop - Upper Reversing Position) |
|---|---|---|---|
| Crank Pivotal Angle (Output Shaft) | 36° (0° →36°) | 155° (36° →191°) | 191° (0° →191°) |
| Wiper Movable Angle | 3° (0° →3°) | 84° (3° →87°) | 87° (0° →87°) |

VEHICLE WIPER DEVICE

BACKGROUND OF THE INVENTION

The present invention relates to a vehicle wiper device.

Japanese Laid-Open Patent Publication No. 4-197854 describes a vehicle wiper device including drive devices located below a windshield at two ends in the widthwise direction of the vehicle. Each drive device includes a drive source (motor body and speed reduction unit) and a link mechanism. Each link mechanism includes a wiper coupling shaft coupled to a wiper. In the vehicle wiper device, the link mechanism also reduces the speed and increases the torque. This allows for reduction in the torque generated by the drive source, which is used to swing the wiper with a predetermined torque, and allows for miniaturization of the drive source.

In such a vehicle wiper device, a wiper fixing shaft is located at a certain position relative to the vehicle body, and the wiper produces a simple rotational action about the axis of the wiper fixing shaft. Thus, the wiper has a wiping range of the wiper having a simple sectoral shape. In recent vehicle wiper devices, a stop position (retraction stop position or the like at the rear side of the hood) is set below a lower reversing position for wiping operations to improve the range of view and improve the appearance as viewed from outside the passenger compartment.

In the vehicle wiper device described above, for example, it is preferable that the wiper be substantially horizontal at the stop position so that the wiper can be completely retracted and the appearance can be improved. When the wiper device is set in such a manner, the wiper is not horizontal at the lower reversing position and is inclined. This makes it difficult to obtain the desired wiping range. Obviously, when the wiper is set to be substantially horizontal at the lower reversing position instead, the wiper is not horizontal at the stop position. This makes it difficult to retract the wiper and adversely affects the appearance.

Further, the moving speed (velocity) of the wiper is low at the basal end of the wiper but high at the distal end. Thus, the stop position of the distal end tends to easily vary. As a result, interference may occur, for example, between the wipers or between the wiper and the vehicle body due to variations in the stop position of the distal end of the wiper. To avoid such a situation, in the prior art, the stop position of the wiper is set in advance so that the wipers are separated to each other by relatively distance at the stop position. Alternatively, the stop position is set in advance so that the wiper stops at a position separated from the vehicle body. Thus, the appearance is poor when the wipers are stopped.

SUMMARY OF THE INVENTION

It is an object of the present invention to provide a vehicle wiper device that improves the appearance and obtains the desired wiping range.

To achieve the above object, a first aspect of the present invention is a vehicle wiper device including a wiper, a drive source, a first pivot member, a second pivot member, and a coupling pivot member. The wiper moves between a first position, which is a stop position, and a second position to wipe a wiping surface. The first pivot member is pivoted back and forth about a first axis by a drive force of the drive source to move the wiper. The first axis is arranged at a fixed position relative to a vehicle body. A second pivot member is pivotal about a second axis. The second axis is arranged at a position differing from the first axis that is a fixed position relative to the vehicle body. The coupling pivot member is coupled to the first pivot member pivotally about a third axis and coupled to the second pivot member pivotally about a fourth axis. The wiper is coupled to the coupling pivot member to pivot integrally with the coupling pivot member. A third position is located between the first position and the second position in a direction in which the wiper moves from the first position toward the second position. A first movable range is formed between the first position and the third position. A line extending through the third axis and the fourth axis is parallel to a line extending through the first axis and the second axis when the wiper is in the first movable range.

A second aspect of the present invention is a vehicle wiper device including a wiper, a drive source, a first pivot member, a second pivot member, and a coupling pivot member. The wiper moves between a stop position and an upper reversing position to wipe a wiping surface. The first pivot member is pivoted back and forth about a first axis by a drive force of the drive source to move the wiper. The first axis is arranged at a fixed position relative to a vehicle body. The second pivot member is pivotal about a second axis. The second axis is arranged at a position differing from the first axis that is a fixed position relative to the vehicle body. The coupling pivot member is coupled to the first pivot member pivotally about a third axis and coupled to the second pivot member pivotally about a fourth axis. The wiper is coupled to the coupling pivot member to pivot integrally with the coupling pivot member. A lower reversing position is located between the stop position and the upper reversing position in a direction in which the wiper moves from the stop position toward the upper reversing position. A first movable range is formed between the stop position and the lower reversing position. A line extending through the third axis and the fourth axis is parallel to a line extending through the first axis and the second axis when the wiper is in the first movable range.

A third aspect of the present invention is a vehicle wiper device including a wiper, a drive source, a first pivot member, a second pivot member, and a coupling pivot member. The wiper moves between a first position and a second position to wipe a wiping surface. The first pivot member pivoted back and forth about a first axis by a drive force of the drive source to move the wiper. The first axis is arranged at a fixed position relative to a vehicle body. The second pivot member is pivotal about a second axis. The second axis is arranged at a position differing from the first axis that is a fixed position relative to the vehicle body. A coupling pivot member is coupled to the first pivot member pivotally about a third axis and coupled to the second pivot member pivotally about a fourth axis. The wiper is coupled to the coupling pivot member to pivot integrally with the coupling pivot member. A third position is located between the first position and the second position in a direction in which the wiper moves from the first position toward the second position. A first movable range is formed between the first position and the third position. A line extending through the third axis and the fourth axis is parallel to a line extending through the first axis and the second axis when the wiper is in the first movable range.

BRIEF DESCRIPTION OF THE DRAWINGS

The invention, together with objects and advantages thereof, may best be understood by reference to the following description of the presently preferred embodiments together with the accompanying drawings in which:

FIG. 6 is an explanatory view illustrating movement of a crank and movement of a wiper of FIG. 2.

DETAILED DESCRIPTION OF THE PREFERRED EMBODIMENTS

One embodiment of the present invention will now be described with reference to FIGS. 1 to 6.

Figure 1:
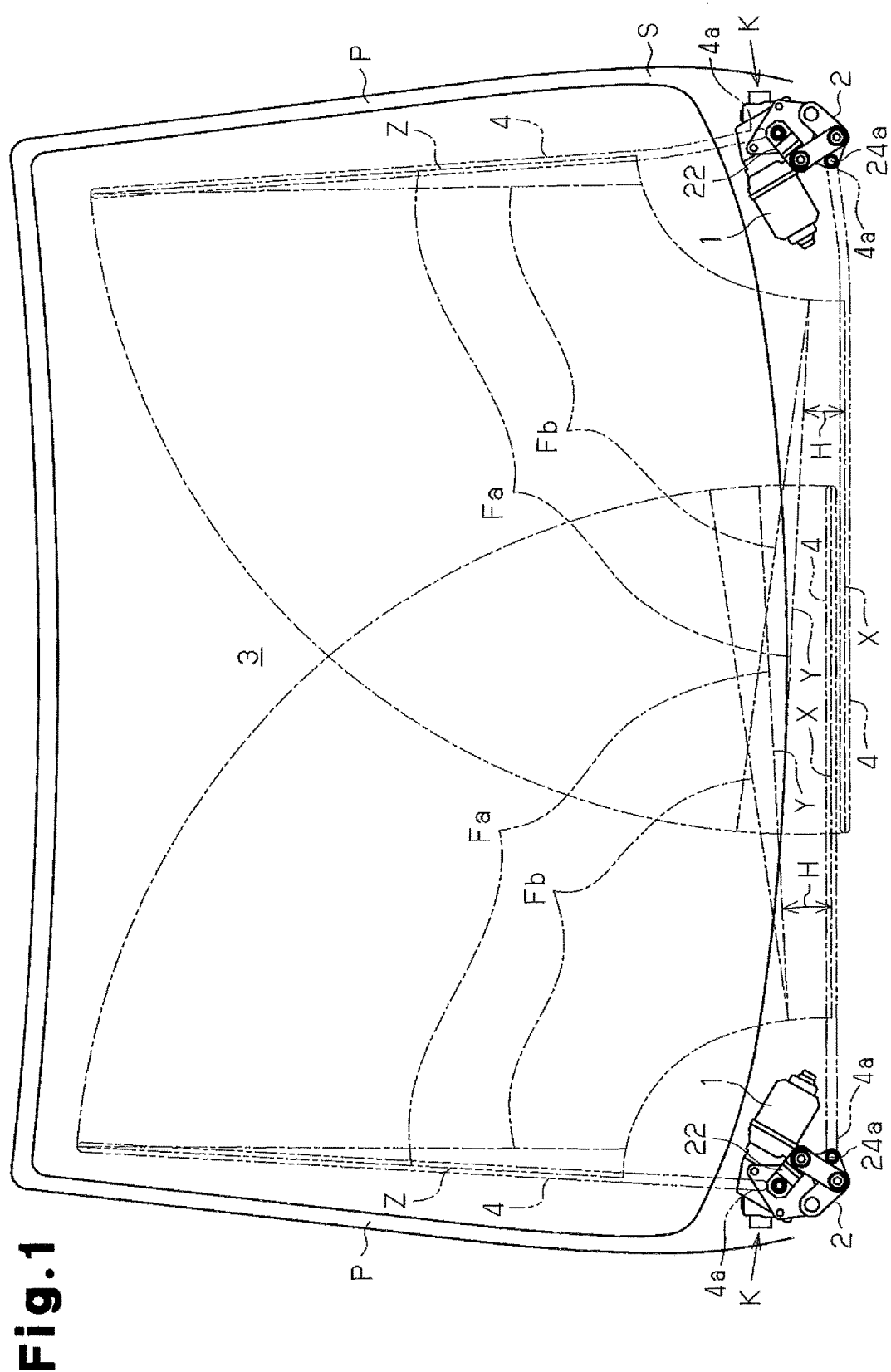
FIG. 1 is a schematic view showing a stop position and a wiping range of a vehicle wiper device according to one embodiment of the present invention.
Figure 2:
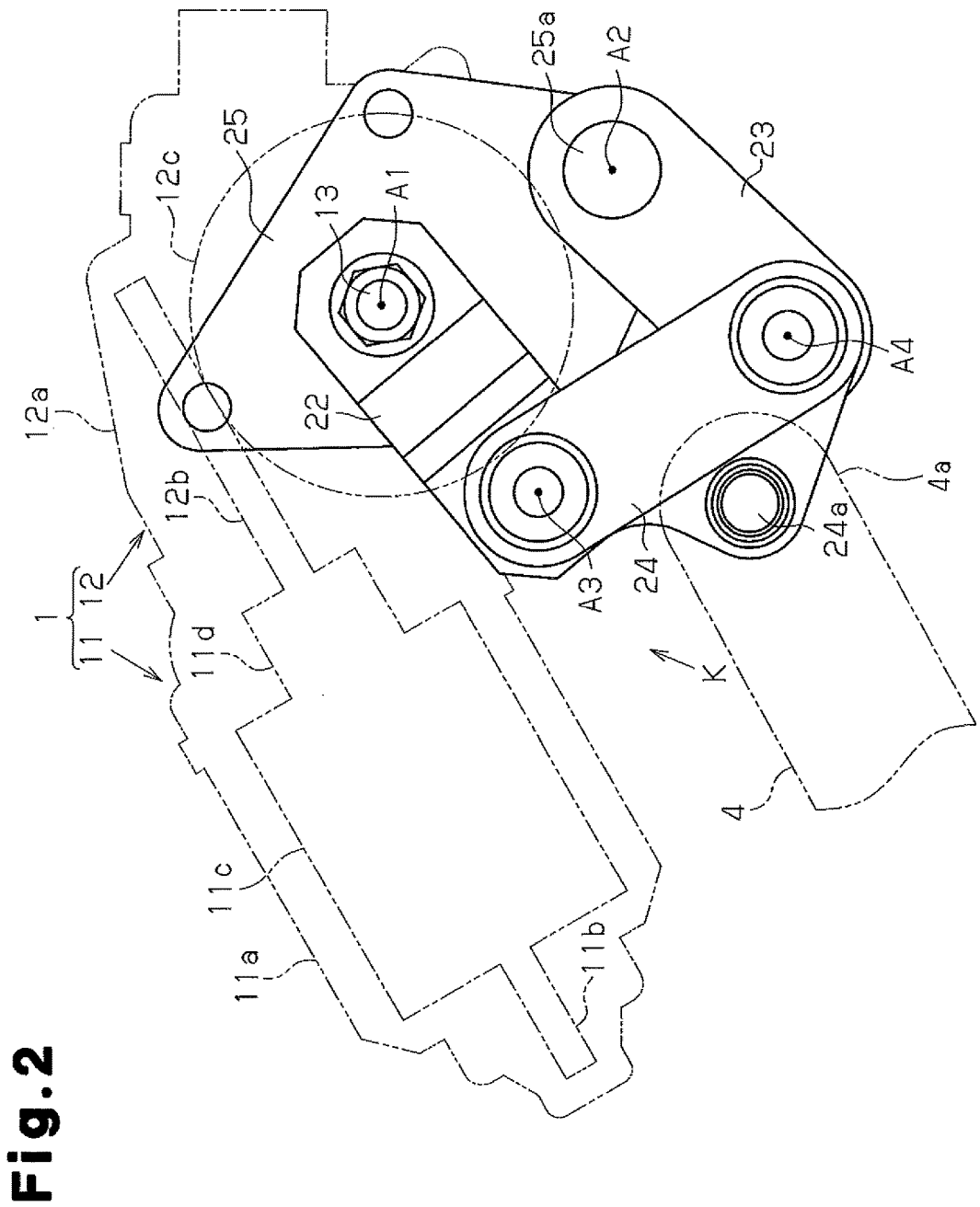
FIG. 2 is a plan view of a drive device shown in FIG. 1.

As shown in FIGS. 1 and 2, a vehicle wiper device includes two drive devices K, each including a motor 1, serving as a drive source, and a link mechanism 2. As shown in FIG. 1, the drive device K is arranged below a windshield 3, serving as a wiping surface in a vehicle body S, at two ends in a widthwise direction of the vehicle. The two drive devices K are arranged to be substantially symmetric with respect to a central line in the vehicle widthwise direction of the windshield 3. At a stop position X (retraction stop position) and a lower reversing position Y, which will be described later, wiper blades of wipers 4, which are coupled to the drive devices K, are arranged to overlap each other in a wiping direction. The wipers have wiping ranges Fa that are partially overlapped at the middle in the vehicle widthwise direction. The wiper device of the present embodiment is a so-called opposing wiping type wiper device. In other words, the wipers 4 of the present embodiment respectively include basal ends 4a located at the two end sides in the vehicle widthwise direction, and the wipers 4 perform an opposing wiping operation so that the wiping ranges Fa are partially overlapped at the middle in the vehicle widthwise direction. At the stop position X (retraction stop position), the wiper 4 at the driver seat side (left side in FIG. 1), which is the first end in the vehicle widthwise direction, is arranged upward from the wiper 4 arranged at a passenger seat side (right side in FIG. 1), which is a second end in the vehicle widthwise direction.

As shown in FIG. 2, the motor 1 includes a motor body 11 and a speed reduction unit 12. FIG. 2 is a view of the motor 1 and the link mechanism 2 at the passenger seat side (right side as viewed in FIG. 1), which is the second end in the vehicle widthwise direction, taken from a diagonally upper side outside the vehicle (distal side in axial direction of an output shaft 13). The motor 1 and the link mechanism 2 at the driver seat side are configured to be substantially identical and substantially symmetric with respect to the central line in the vehicle widthwise direction. The motor body 11 includes a yoke 11a, which is substantially tubular and has a closed end, permanent magnets (not shown), which are fixed to an inner surface of the yoke 11a, a rotation shaft 11b, which is rotatably supported in the yoke 11a, an armature core 11c, which is fixed to the rotation shaft 11b, coils (not shown), which are wound around the armature core 11c, a commutator 11d, and the like. The motor body 11 rotates and drives the rotation shaft 11b. The speed reduction unit 12 includes a gear housing 12a, which is fixed to an open end of the yoke 11a, a worm 12b, which rotates integrally rotates with the rotation shaft 11b in the gear housing 12a, a worm wheel 12c, which is engaged with the worm 12b, and the output shaft 13, which projects out of the gear housing 12a and rotates integrally with the worm wheel 12c. The worm 12b and the worm wheel 12c form a worm gear. The worm 12b and the worm wheel 12c reduce the rotation speed of the rotation shaft 11b and rotate the output shaft 13.

The link mechanism 2 includes a crank 22 serving as a first pivot member, a lever 23 serving as a second pivot member, and a rod 24 serving as a coupling pivot member. The crank 22 has a basal end fixed to the output shaft 13. The motor 1 is fixed to the vehicle body S so that the crank 22 is pivotal about a first axis A1 (axis of output shaft 13) at a fixed position relative to the vehicle body S. The lever 23 has a distal end supported to be pivotal about a second axis A2, which differs from the first axis A1, at a fixed position relative to the vehicle body S. The rod 24 has a basal end, which is coupled to a distal end of the crank 22 so as to be pivotal about a third axis A3, and a distal end, which is coupled to a basal end of the lever 23 so as to be pivotal about a fourth axis A4. The lever 23 of the present embodiment is supported to be pivotal by a support shaft 25a of a coupling bracket 25, which is fixed to the gear housing 12a and fixed to the vehicle body S. In the present embodiment, the length between the second axis A2 and the fourth axis A4 is set to be slightly shorter than the length between the first axis A1 and the third axis A3, and the length between the first axis A1 and the second axis A2 is set to be slightly shorter than the length between the third axis A3 and the fourth axis A4.

The rod 24 includes a wiper fixing shaft 24a that fixes a basal end (arm head) 4a of the wiper 4, which wipes the windshield 3, at a fixed posture. In other words, the wiper 4 is fixed to the wiper fixing shaft 24a so that its position (angular relationship) in the longitudinal direction relative to the longitudinal direction of the rod 24 does not change. The wiper fixing shaft 24a of the present embodiment is arranged at a position extending outward from an intermediate position of the third axis A3 and the fourth axis A4 (toward side opposite to the output shaft 13 from the rod 24 when the wiper 4 is located at the stop position X).

The motor 1 of the present embodiment includes a sensor (not shown) capable of detecting the pivot angle of the worm wheel 12c. The motor 1 controls the rotation angle and the rotation speed of the worm wheel 12c, the output shaft 13, and the crank 22 based on the detection signal from the sensor.

A controller (not shown) pivots the crank 22 so that the wiper 4 moves between a stop position X (retraction stop position) serving as a first position and an upper reversing position Z serving as a second position, as shown in FIG. 1. In detail, the crank 22 is pivoted so that the wiper 4 moves (swings back and forth) between the preset upper reversing position Z and the lower reversing position Y serving as a third position when wiping the windshield 3. When stopping the wiper 4, the crank 22 is pivoted so that the wiper 4 stops at the stop position X (retraction stop position) that is below the lower reversing position Y. The stop position of the present embodiment is located at the rear side of a hood (not shown) and serves as the retraction stop position where the wiper 4 is substantially retracted. The lower reversing position Y of the present embodiment is where the distal end of the wiper 4 substantially lies along the lower end of the windshield 3.

Figure 3A:
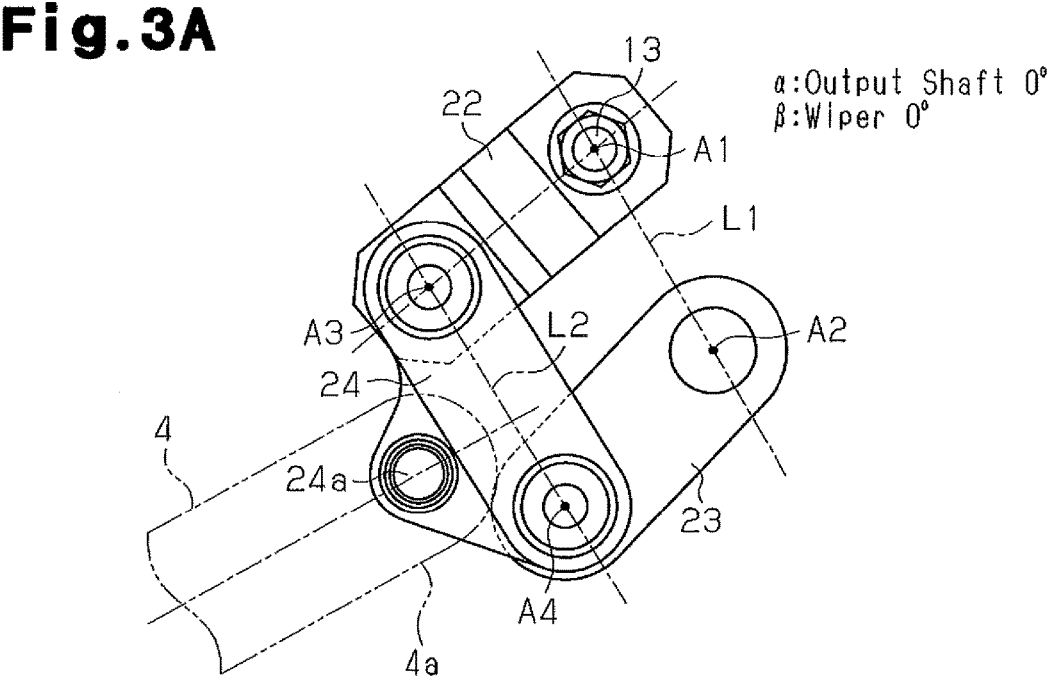
FIGS. 3A to 5B are plan views each illustrating the operation of a link mechanism shown in FIG. 2.
Figure 3B:
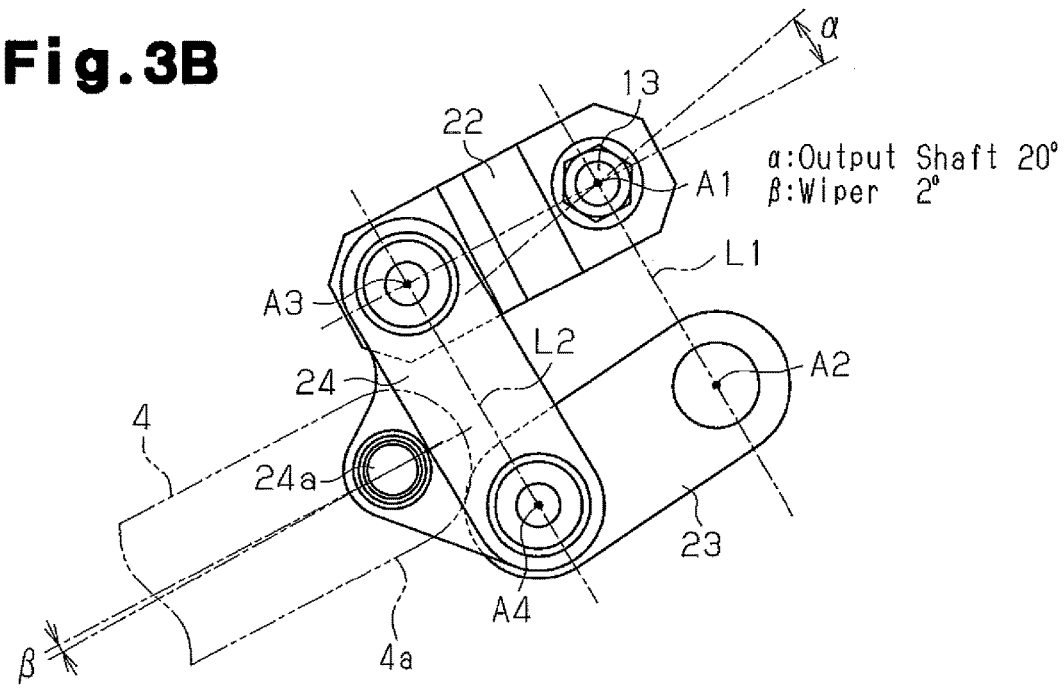

The link mechanism 2 is set so that the wiper 4 is within a movable range H between the stop position X and the lower reversing position Y (first movable range H extending from the stop position X to the lower reversing position Y) when a line L2 extending through the third axis A3 and the fourth axis A4 is parallel to a line L1 extending through the first axis A1 and the second axis A2 (refer to FIG. 3B). In other words, the line L2 is set to be parallel to the line L1 when the wiper 4 is within the first movable range H between the stop position X and the lower reversing position Y (first movable range H extending from the stop position X to the lower reversing position Y).

More specifically, when the wiper 4 is located at the stop position X (refer to FIG. 1), as shown in FIG. 3A, although the line L2 is substantially parallel to the line L1, the link mechanism 2 is set so that the line L2 approaches the line L1 at lower locations of the line L2 (toward distal side in a direction from the third axis A3 toward the fourth axis A4).

Figure 4A:
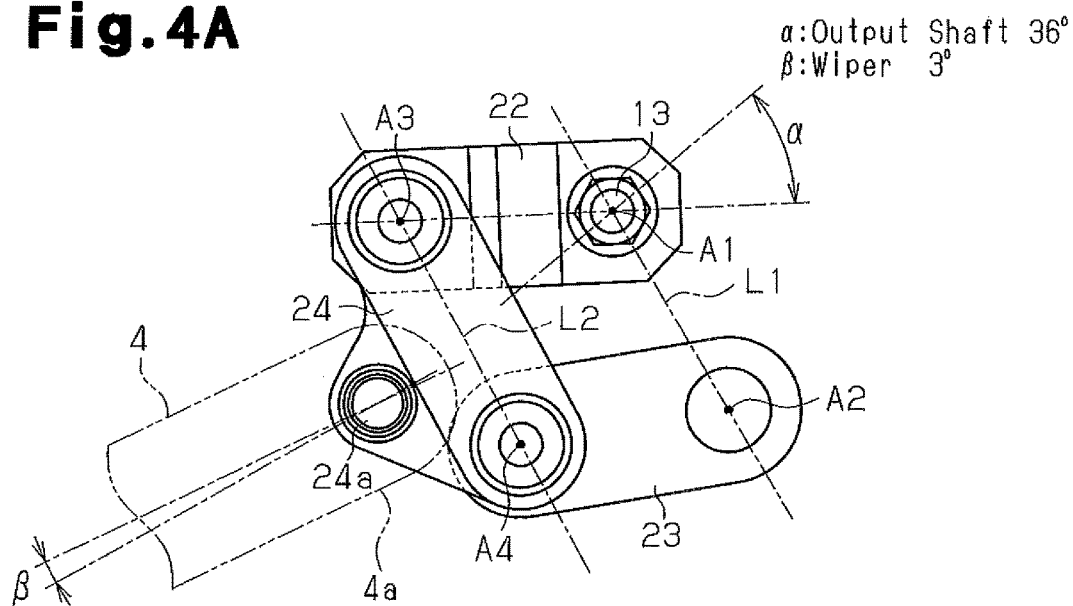

Further, when the wiper 4 is located at the lower reversing position Y (refer to FIG. 1), as shown in FIG. 4A, although the line L2 is substantially parallel to the line L1, the link mechanism 2 is set so that the line L2 approaches the line L1 at upper locations of the line L2 (toward distal side in a direction from the fourth axis A4 toward the third axis A3).

Figure 4B:
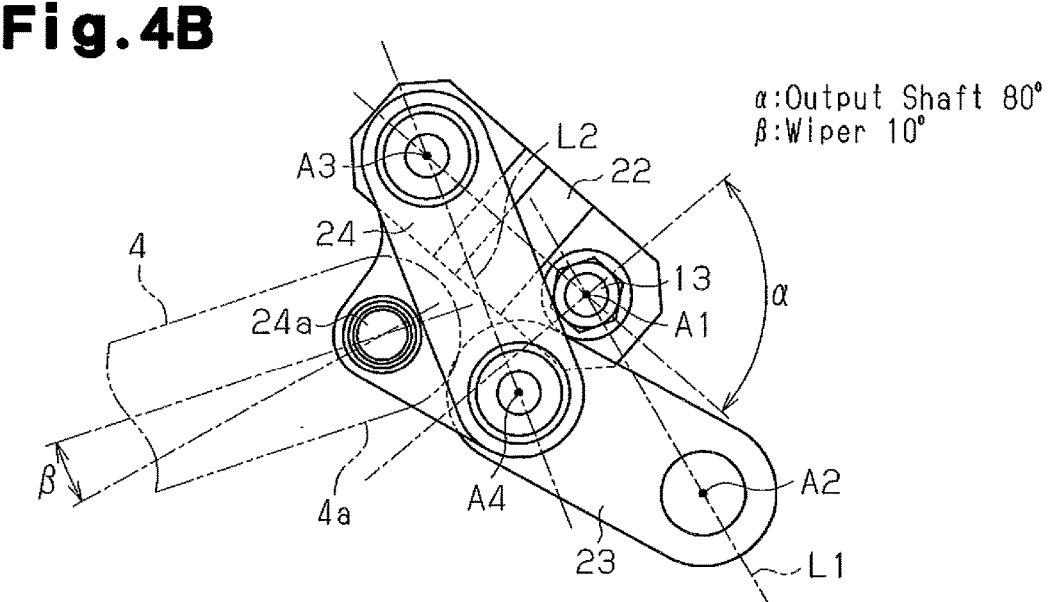
Figure 5A:
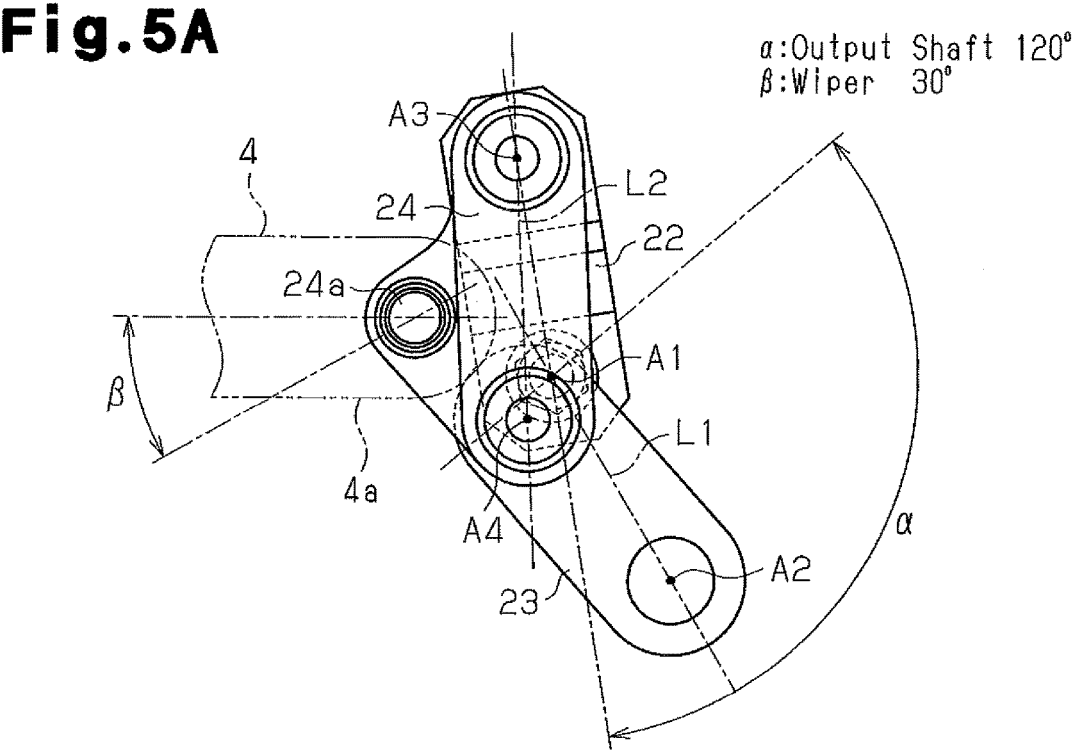
Figure 5B:
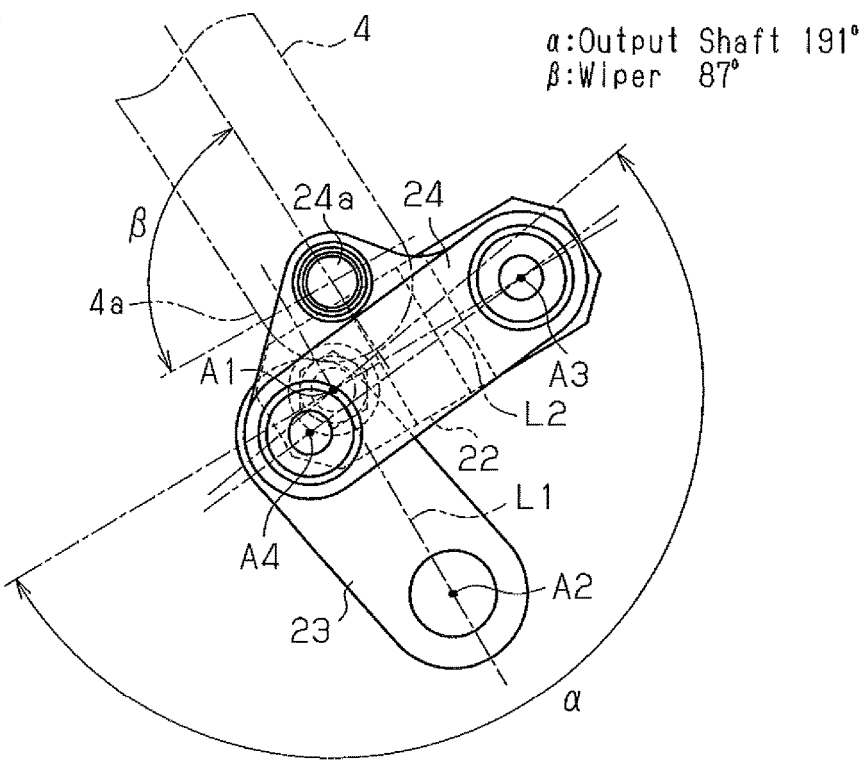

The link mechanism 2 is set so that the rod 24 pivots as the crank 22 pivots, as shown in FIGS. 4B and 5A, when the wiper 4 moves from the lower reversing position Y to the upper reversing position Z (performs a wiping operation), and so that the line L2 is substantially orthogonal to the line L1, as shown in FIG. 5B, when the wiper 4 is located at the upper reversing position Z.

More specifically, the crank 22 (output shaft 13) is pivoted by 20° from the state shown in FIG. 3A to the state shown in FIG. 3B. This moves and pivots the wiper 4 by 2°. Therefore, in FIG. 3B, the pivot angle α of the output shaft 13 from the stop position shown in FIG. 3A is 20°, and the pivot angle β of the wiper 4 is 2°. The crank 22 (output shaft 13) is pivoted by 16° from the state shown in FIG. 3B to the state shown in FIG. 4A. This moves and pivots the wiper 4 by 1°. Therefore, in FIG. 4A, the pivot angle α of the output shaft 13 from the stop position shown in FIG. 3A is 36°, and the pivot angle β of the wiper 4 is 3°. The crank 22 (output shaft 13) is pivoted by 44° from the state shown in FIG. 4A to the state shown in FIG. 4B. This moves and pivots the wiper 4 by 7°. Therefore, in FIG. 4B, the pivot angle α of the output shaft 13 from the stop position shown in FIG. 3A is 80°, and the pivot angle β of the wiper 4 is 10°. The crank 22 (output shaft 13) is pivoted by 40° from the state shown in FIG. 4B to the state shown in FIG. 5A. This moves and pivots the wiper 4 by 20°. Therefore, in FIG. 5A, the pivot angle α of the output shaft 13 from the stop position shown in FIG. 3A is 120°, and the pivot angle β of the wiper 4 is 30°. The crank 22 (output shaft 13) is pivoted by 71° from the state shown in FIG. 5A to the state shown in FIG. 5B. This moves and pivots the wiper 4 by 57° accompanying therewith. Therefore, in FIG. 5B, the pivot angle α of the output shaft 13 from the stop position shown in FIG. 3A is 191°, and the pivot angle β of the wiper 4 is 87°.

In this manner, as shown in FIG. 6, in the present embodiment, in the first movable range H in which the wiper 4 moves from the stop position X to the lower reversing position Y, the crank 22 is pivoted by 36° from the state shown in FIG. 3A to the state shown in FIG. 4A. This moves and pivots the wiper 4 by 3°. Then, in the wiping rage Fa, which is a second movable range in which the wiper 4 moves from the lower reversing position Y to the upper reversing position Z, the crank 22 is pivoted by 155° from the state shown in FIG. 4A to the state shown in FIG. 5B. This moves and pivots the wiper 4 by 84°. In an overall movable range in which the wiper 4 moves from the stop position X to the upper reversing position Z, the crank 22 is pivoted by 191°. This moves and pivots the wiper 4 by 87°.

As shown in FIG. 1, the first movable range H is smaller than the wiping range Fa (second movable range). Further, the movable angle of the wiper 4 relative to the unit pivot angle of the crank 22 is 3°/36° in the first movable range H, and 84°/155° in the wiping range Fa (second movable range). In other words, the movable angle of the wiper 4 relative to the unit pivot angle of the crank 22 is greater in the wiping range Fa than in the first movable range H.

The link mechanism 2 is set so that when the wiper 4 is at the upper reversing position Z (refer to FIG. 1), as shown in FIG. 5B, the wiper fixing shaft 24a, to which the basal end 4a of the wiper 4 is fixed, is located at the outer side in the widthwise direction (right side as viewed in FIG. 4A and FIG. 5B) of the vehicle body S from the location of the wiper fixing shaft 24a at the lower reversing position Y (refer to FIG. 4A). The link mechanism 2 is set so that when the wiper 4 is at the upper reversing position Z, the basal end 4a of the wiper 4 (wiper fixing shaft 24a) is located at the outer side in the widthwise direction of the vehicle body S from the basal end 4a (wiper fixing shaft 24a) of the wiper 4 at the stop position (refer to FIG. 3A). In the present embodiment, the link mechanism 2 is set so that when the wiper 4 is at the upper reversing position Z, the wiper fixing shaft 24a is arranged at the outer side in the widthwise direction (right side as viewed in FIG. 5) of the vehicle body S from the line L1.

The operation of the vehicle wiper device will now be described.

For example, when the motor 1, which is capable of producing forward and reverse rotation, is driven based on the operation of an operation switch arranged near the driver seat and the wiper 4 is located at the stop position X (refer to FIG. 1), the rod 24 first performs an action close to a translation (slide), that is, the rod 24 moves barely pivoting (change in position), and the wiper 4 moves to the lower reversing position Y (refer to FIG. 1), as shown in FIGS. 3A, 3B, and 4A. Then, the rod 24 is pivoted back and forth, that is, the rod 24 undergoes pivoting actions and is pivoted back and forth to repeat the state shown in FIG. 4A and the state shown in FIG. 5B. This moves (swings back and forth) the wiper 4 between the lower reversing position Y and the upper reversing position Z (refer to FIG. 1) to wipe the windshield 3. When the wiper 4 is located at the upper reversing position Z, as shown in FIG. 5B, the wiper fixing shaft 24a is arranged at the outer side in the widthwise direction (right side in FIG. 5) of the vehicle body S from the location of the wiper fixing shaft 24a at the lower reversing position Y (refer to FIG. 4A). Further, as shown in FIG. 1, the basal end (arm head) 4a of the wiper 4 is also arranged at the outer side in the widthwise direction of the vehicle body S from the location of the basal end 4a of the wiper 4 at the lower reversing position Y (refer to FIG. 4A).

Next, when the wiper 4 is stopped based on the operation of the operation switch, the controller controls the rotation produced by the motor 1, and the link mechanism 2 realizes the state shown in FIG. 3A. When the motor 1 is stopped, the wiper 4 is stopped at the stop position X (refer to FIG. 1).

The above embodiment has the advantages described below.

(1) The link mechanism 2 is set so that the wiper 4 is located between the stop position X and the lower reversing position Y when the line L2 extending through the third axis A3 and the fourth axis A4 is parallel to the line L1 extending through the first axis A1 and the second axis A2. In other words, when the wiper 4 moves in the first movable range H between the stop position X and the lower reversing position Y, the link mechanism 2 is set so that the line L2 is parallel to the line L1. Thus, the rod 24 undergoes actions close to a translation (slide) when the wiper 4 moves between the stop position X and the lower reversing position Y. Thus, when the vehicle is located on a horizontal surface, the wiper 4 may be substantially horizontal at the lower reversing position Y and at the stop position X. For example, this allows for the wiper 4 to be stopped substantially horizontally at the stop position X, and the wiper 4 may be completely retracted in the rear side of the hood at the retraction stop position to improve the appearance at the stop position X in the present embodiment. Furthermore, the wiper 4 is also substantially horizontal at the lower reversing position Y, and the wiper 4 substantially lies along the lower end of the windshield 3 in the present embodiment. This obtains the desired wiping range Fa. FIG. 1 shows a wiping range Fb at the inner side of the wiping range Fa. The wiping range Fb is the wiping range when the wiper fixing shaft is located at a fixed position relative to the vehicle body S. The wiping range Fb has a simple sectoral shape. In other words, when the link mechanism is set so that the wiper 4 stops substantially horizontally at the stop position X in the link mechanism in which the wiper fixing shaft is located at a fixed position relative to the vehicle body S, the desired wiping range Fa is not obtained since the wiper is not horizontal and is inclined at the lower reversing position, as shown in the wiping range Fb of FIG. 1. In the present embodiment, the desired wiping range Fa is obtained.

(2) The link mechanism 2 is set so that the basal end (arm head) 4a of the wiper 4 at the upper reversing position Z is arranged at the outer side in the widthwise direction of the vehicle body S from the basal end 4a of the wiper 4 at the lower reversing position Y or the stop position X. Thus, the wiping range Fa at the basal end side of the wiper 4 at the upper reversing position Z is widened toward the outer side in the widthwise direction of the vehicle body S as compared to the simple sectoral shape wiping range Fb. In the present embodiment, the wiping range Fa is a range that substantially lies along the pillar P of the vehicle body S and reduces the non-wiped portion.

(3) The link mechanism 2 is set so that the movable angle of the wiper 4 relative to the unit pivot angle of the crank 22 is greater in the wiping range Fa than in the first movable range H. Thus, when the crank 22 is pivoted at a constant speed, the wiper 4 is moved faster in the wiping range Fa than in the first movable range H. In other words, the wiper 4 moves slowly in the first movable range H than in the wiping range Fa. Therefore, for example, the collision of the wipers 4 moving toward the stop position X is suppressed, and even if the wipers 4 hit each other, the impact is small.

(4) The two wipers 4 have basal ends 4a located at the two ends in the vehicle widthwise direction. The two wipers 4 perform opposing wiping so that the wiping ranges Fa are partially overlapped at the middle in the vehicle widthwise direction. Thus, the entire wiping range becomes substantially symmetric with respect to the central line in the vehicle widthwise direction. This obtains a good field of view.

The above embodiment may be modified as described below.

In the above embodiment, the link mechanism 2 is set so that the basal end (arm head) 4a of the wiper 4 at the upper reversing position Z is arranged at the outer side in the widthwise direction of the vehicle body S from the basal end 4a of the wiper 4 at the lower reversing position Y. Instead, the link mechanism 2 may be set so that the basal end 4a of the wiper 4 is not arranged at the outer side in the widthwise direction of the vehicle body S, particularly, at the upper reversing position. This also obtains advantage (1) of the above embodiment.

In the above embodiment, the length between the second axis A2 and the fourth axis A4 is set to be slightly shorter than the length between the first axis A1 and the third axis A3, and the length between the first axis A1 and the second axis A2 is set to be slightly shorter than the length between the third axis A3 and the fourth axis A4. However, this setting may be changed in accordance with the desired wiping range or the like. In the first movable range H, the crank 22 is pivoted by 36°. This moves and pivots the wiper 4 by 3°. Then, the crank 22 is pivoted by 155°. This moves and pivots the wiper 4 by 84° in the wiping range Fa. Instead, the link mechanism 2 may be set to obtain an angle that differs from the angle of the embodiment.

Although not particularly mentioned in the above embodiment, the link mechanism 2 may be set so that the wiper fixing shaft 24a is located at the outer side in the widthwise direction of the vehicle body S from the first axis A1 when the wiper 4 is located at the upper reversing position Z. Thus, for example, the wiping range of the basal end 4a of the wiper 4 at the upper reversing position Z may be further widened toward the outer side in the widthwise direction of the vehicle body compared to the simple sector-shaped wiping range obtained when the wiper 4 is pivoted about the first axis A1.

Although not particularly mentioned in the above embodiment, the link mechanism 2 may be set so that the movement amount and the moving speed from the stop position X to the lower reversing position Y of the wiper 4 arranged at the driver seat side, which is arranged on the upper side than the wiper 4 arranged on the passenger seat side, is greater than the movement amount and the moving speed from the stop position X to the lower reversing position Y of the wiper 4 arranged on the passenger seat side. This moves the wiper 4 at the driver seat side more quickly than the passenger seat side so that the collision of the wipers 4 in the first movable range H may be suppressed.

In the above embodiment, the present invention is embodied in the vehicle wiper device in which the lower reversing position Y, for when wiping back and forth the wiping surface, is located above the stop position X. Instead, for example, the present invention may be embodied in a vehicle wiper device in which the stop position and the lower reversing position are located at the same position.

In this case, the first position serves as the lower reversing position Y, the second position serves as the upper reversing position Z, and the third position serves as a middle position set in advance above the lower reversing position (stop position).

In the above embodiment, the present invention is applied to the so-called opposing wiping type wiper device in which the wiper blades of the wipers 4 are arranged to overlap each other in the wiping direction at the stop position X (retraction stop position) and the lower reversing position Y, and one wiper 4 and the other wiper 4 swing back and forth in opposite directions to wipe the windshield 3. Instead, for example, the present invention may be applied to a so-called tandem type wiper device in which the wiper blades of the wipers 4 are arranged next to each other in the widthwise direction of the windshield 3 at the stop position (retraction stop position), and one wiper 4 and the other wiper 4 swing back and forth together in the same direction to wipe the windshield 3.

The invention claimed is:

1. A vehicle wiper device comprising:
   a wiper that moves between a first position, which is a stop position, and a second position, which is an upper reversing position, to wipe a wiping surface;

a drive source;
a first pivot member pivoted back and forth about a first axis, which is an axis of an output shaft of the drive source, by a drive force of the drive source to move the wiper, wherein the first axis is arranged at a fixed position relative to a vehicle body;
a second pivot member pivotal about a second axis, wherein the second axis is arranged at a position differing from the first axis that is a fixed position relative to the vehicle body; and
a coupling pivot member coupled to the first pivot member pivotally about a third axis and coupled to the second pivot member pivotally about a fourth axis, wherein the wiper is coupled to the coupling pivot member to pivot integrally with the coupling pivot member and to extend from the coupling pivot member toward an opposite side of the first pivot member and the second pivot member, wherein
a third position is located between the first position and the second position in a direction in which the wiper moves from the first position toward the second position, and a first movable range is formed between the first position and the third position,
a second movable range is formed between the third position and the second position,
the first movable range is smaller than the second movable range,
a line extending through the third axis and the fourth axis is parallel to a line extending through the first axis and the second axis when the wiper is in a predetermined position of the first movable range,
the line extending through the third axis and the fourth axis intersects with the first axis when the wiper is in a predetermined position of the second movable range,
the wiper is one of two wipers,
the two wipers respectively include basal ends located at two ends in a vehicle widthwise direction,
the two wipers swing back and forth in opposite directions to perform opposing wiping,
the drive source is one of two drive sources, and
the two drive sources are respectively arranged in the two wipers.

2. The vehicle wiper device according to claim 1, wherein a movable angle of the wiper relative to a unit pivot angle of the first pivot member is greater in the second movable range than in the first movable range.

3. The vehicle wiper device according to claim 1, wherein when the wiper is located at the second position, the basal end is located further outward in a widthwise direction of the vehicle body than the position of the basal end at the time when the wiper is located at the first position.

4. The vehicle wiper device according to claim 1, wherein the coupling pivot member includes a wiper fixing shaft that fixes the basal end at a fixed position, and
the wiper fixing shaft is located further outward in a widthwise direction of the vehicle body from the first axis when the wiper is located at the second position.

5. The vehicle wiper device according to claim 1, wherein the two wipers perform the opposing wiping so that wiping ranges are partially overlapped at a middle potion in the vehicle widthwise direction.

6. The vehicle wiper device according to claim 5, wherein one of the two wipers is a first wiper arranged at a first end in the vehicle widthwise direction,
the other one of the two wipers is a second wiper arranged at a second end in the vehicle widthwise direction;

the first wiper is arranged above the second wiper,
the second wiper moves between a fourth position, which is a stop position, and a fifth position to wipe the wiping surface,
a sixth position is located between the fourth position and the fifth position in a direction in which the second wiper moves from the fourth position toward the fifth position and
a movement amount of the first wiper from the first position to the third position is greater than a movement amount of the second wiper from the fourth position to the sixth position.

7. The vehicle wiper device according to claim 1, wherein the third position is located above the first position, and the third position is a lower reversing position when the wiper moves back and forth to wipe the wiping surface.

8. The vehicle wiper device according to claim 1, wherein when the wiper moves between the first position and the second position, a length between the first axis and the second axis is fixed.

9. A vehicle wiper device comprising:
a wiper that moves between a stop position and an upper reversing position to wipe a wiping surface;
a drive source;
a first pivot member pivoted back and forth about a first axis, which is an axis of an output shaft of the drive source, by a drive force of the drive source to move the wiper, wherein the first axis is arranged at a fixed position relative to a vehicle body;
a second pivot member pivotal about a second axis, wherein the second axis is arranged at a position differing from the first axis that is a fixed position relative to the vehicle body; and
a coupling pivot member coupled to the first pivot member pivotally about a third axis and coupled to the second pivot member pivotally about a fourth axis, wherein the wiper is coupled to the coupling pivot member to pivot integrally with the coupling pivot member and to extend from the coupling pivot member toward an opposite side of the first pivot member and the second pivot member, wherein
a lower reversing position is located between the stop position and the upper reversing position in a direction in which the wiper moves from the stop position toward the upper reversing position, and a first movable range is formed between the stop position and the lower reversing position,
a second movable range is formed between the lower reversing position and the upper reversing position,
the first movable range is smaller than the second movable range,
a line extending through the third axis and the fourth axis is parallel to a line extending through the first axis and the second axis when the wiper is in a predetermined position of the first movable range, and
the line extending through the third axis and the fourth axis intersects with the first axis when the wiper is in a predetermined position of the second movable range,
the wiper is one of two wipers,
the two wipers respectively include basal ends located at two ends in a vehicle widthwise direction,
the two wipers swing back and forth in opposite directions to perform opposing wiping,
the drive source is one of two drive sources, and
the two drive sources are respectively arranged in the two wipers.

10. A vehicle wiper device comprising:
a wiper that moves between a lower reversing position and an upper reversing position to wipe a wiping surface;
a drive source;
a first pivot member pivoted back and forth about a first axis, which is an axis of an output shaft of the drive source by a drive force of the drive source to move the wiper, wherein the first axis is arranged at a fixed position, which is a lower reversing position, relative to a vehicle body;
a second pivot member pivotal about a second axis, wherein the second axis is arranged at a position differing from the first axis that is a fixed position relative to the vehicle body; and
a coupling pivot member coupled to the first pivot member pivotally about a third axis and coupled to the second pivot member pivotally about a fourth axis, wherein the wiper is coupled to the coupling pivot member to pivot integrally with the coupling pivot member and to extend from the coupling pivot member toward an opposite side of the first pivot member and the second pivot member, wherein
a middle position is located between the lower reversing position and the upper reversing position in a direction in which the wiper moves from the lower reversing position toward the upper reversing position, and a first movable range is formed between the lower reversing position and the middle position,
a second movable range is formed between the middle position and the upper reversing position,
the first movable range is smaller than the second movable range,
a line extending through the third axis and the fourth axis is parallel to a line extending through the first axis and the second axis when the wiper is in a predetermined position of the first movable range, and
the line extending through the third axis and the fourth axis intersects with the first axis when the wiper is in a predetermined position of the second movable range,
the wiper is one of two wipers,
the two wipers respectively include basal ends located at two ends in a vehicle widthwise direction,
the two wipers swing back and forth in opposite directions to perform opposing wiping,
the drive source is one of two drive sources, and
the two drive sources are respectively arranged in the two wipers.

* * * * *